US011132447B1

(12) United States Patent
Sun et al.

(10) Patent No.: US 11,132,447 B1
(45) Date of Patent: Sep. 28, 2021

(54) DETERMINING SECURITY VULNERABILITIES OF INTERNET OF THINGS DEVICES (71) Applicant: SYMANTEC CORPORATION, Mountain View, CA (US)

(72) Inventors: Yuqiong Sun, San Jose, CA (US); Xueqiang Wang, Bloomington, IN (US); Susanta K. Nanda, San Jose, CA (US); Petros Efstathopoulos, Los Angeles, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 299 days.

(21) Appl. No.: 16/368,672

(22) Filed: Mar. 28, 2019

(51) Int. Cl.
*G06F 11/00* (2006.01)
*G06F 21/57* (2013.01)
*H04L 29/06* (2006.01)
*H04L 12/28* (2006.01)
*H04L 12/24* (2006.01)

(52) U.S. Cl.
CPC ........ *G06F 21/577* (2013.01); *H04L 12/2807* (2013.01); *H04L 41/0853* (2013.01); *H04L 41/0869* (2013.01); *H04L 63/1458* (2013.01)

(58) Field of Classification Search
CPC ............... G06F 21/577; H04L 41/0869; H04L 41/0853; H04L 12/2807; H04L 63/1458
See application file for complete search history.

(56) References Cited

U.S. PATENT DOCUMENTS 8,413,135 B2 * 4/2013 Aaron ..................... G06F 21/51
717/174
10,133,863 B2 * 11/2018 Bu ......................... G06F 21/566
2017/0093918 A1 * 3/2017 Banerjee ............. H04L 63/1425
(Continued)

OTHER PUBLICATIONS

Costin, A. et al.; "Automated Dynamic Firmware Analysis at Scale: A Case Study on Embedded Web Interfaces"; presented at: ASIA CCS '16: Proceedings of the 11th ACM on Asia Conference on Computer and Communications Security; May 30-Jun. 3, 2016; 16 pages.

(Continued)

*Primary Examiner* — Richard G Keehn
(74) *Attorney, Agent, or Firm* — Maschoff Brennan (57) ABSTRACT Determining security vulnerabilities of smart home devices. A method may include obtaining data regarding a first application associated with a first IoT device associated with a known security vulnerability; analyzing the data regarding the first application to analyze expected communications with the first IoT device; identifying a second application available for download associated with a second IoT device; analyzing expected communications between the second application and the second IoT device; comparing the expected communications between the first application and first IoT device and between the second application and second IoT device to determine a similarity level between the first and second IoT devices; determining the second IoT device shares the same known security vulnerability as the first IoT device based on determining the similarity level; and implementing a security action on the second IoT device based on determining that the second IoT device shares the same known security vulnerability.

20 Claims, 3 Drawing Sheets

(56) References Cited

U.S. PATENT DOCUMENTS

| | | | |
|---|---|---|---|
| 2017/0264644 A1* | 9/2017 | Mihan | G06F 21/577 |
| 2018/0349612 A1* | 12/2018 | Harel | G06F 21/577 |
| 2019/0268370 A1* | 8/2019 | Ogrinz | H04L 63/1458 |
| 2020/0245233 A1* | 7/2020 | Qian | H04L 47/78 |
| 2020/0265134 A1* | 8/2020 | Cristina | G06F 21/577 |
| 2020/0296119 A1* | 9/2020 | Lim | H04L 63/1458 |

OTHER PUBLICATIONS

Costin, A. et al.; "A Large-Scale Analysis of the Security of Embedded Firmwares"; presented at: Proceedings of the 23rd USENIX Security Symposium; Aug. 20-22, 2014; 17 pages.

Chen, J. et al.; "IoTFuzzer: Discovering Memory Corruptions in IoT Through App-based Fuzzing"; presented at: Network and Distributed Systems Security (NDSS) Symposium 2018; Feb. 18-21, 2018; 7 pages.

U.S. Appl. No. 16/233,366, titled "Systems and Methods for Fingerprinting Devices"; filed Dec. 27, 2018; 58 pages.

* cited by examiner

DETERMINING SECURITY VULNERABILITIES OF INTERNET OF THINGS DEVICES

BACKGROUND

Smart home devices, or home automation devices, are devices which may be integrated into the electronic elements of a home (or an office or other building, a vehicle, etc.) to automate tasks and applications. For example, smart home devices may control lighting, heating, ventilation, air conditioning (HVAC) systems, entertainment systems, appliances, etc. Each of these devices may be part of what is referred to as the Internet of Things, or a network of devices that contain electronics, software, sensors, actuators, and connectivity (e.g., cellular, Wi-Fi, wired) which enable the devices to connect, interact, exchange data, and perform tasks.

As technology improves, more devices join the Internet of Things and are enabled to control more and more devices in a home, a vehicle, an office, etc. While many smart home devices are developed by larger technology companies, more smart home devices are being developed by smaller companies that are in a race to create a prototype and then a working product as quickly as possible. As a result, there are frequently critical security vulnerabilities and security issues present in smart home devices.

Unfortunately, it can be difficult to determine the presence of potential security vulnerabilities in smart home devices in order to protect users from potential or actual attacks.

SUMMARY

In some embodiments, a computer-implemented method for determining and protecting against a security vulnerability of an IoT device may be performed, at least in part, by a computing device including one or more processors. The method may include obtaining, by the security computing device, data regarding a first software application ("app") associated with a first IoT device, the first IoT device associated with a known security vulnerability; analyzing, by the security computing device, the data regarding the first software app to analyze expected communications between the first software app and the first IoT device; identifying, by the security computing device, a second software app, the second security software app being associated with a second IoT device and available for download; analyzing, by the security computing device, expected communications between the second software app and the second IoT device; comparing, by the security computing device, the expected communications between the first software app and the first IoT device and between the second software app and the second IoT device to determine a similarity level between the first IoT device and the second IoT device; determining, by the security computing device, that the second IoT device shares the same known security vulnerability as the first IoT device based on the similarity level; and implementing, by the security computing device, a security action on the second IoT device based on the determination that the second IoT device shares the same known security vulnerability as the first IoT device.

In some embodiments, the method may further include, after determining that the second IoT device shares the same known security vulnerability, determining, by the security computing device, that the second IoT device is connected to a network.

In some embodiments, the implementing of the security action further comprises at least one of sending a notification to a vendor associated with the second IoT device to update the second IoT device firmware, blocking network connectivity to the second IoT device, or sending an alert to the user of the second IoT device that a security issue is potentially or actually present, or a combination thereof.

In some embodiments, the method may further include determining, by the security computing device, that the first IoT device and the second IoT device share at least one of the same firmware, hardware, protocol, or backend service, or a combination thereof, based at least in part on determining the similarity level.

In some embodiments, the analyzing of the expected communications may further include identifying, by the security computing device, a request between the first or second software app and the first or second IoT device, respectively; and identifying, by the security computing device, an expected response to the request In some embodiments, the identifying of the second software app may further include obtaining, by the security computing device, keywords associated with known IoT devices; and crawling, by the security computing device, an online software app store to identify that the second software app is associated with keywords associated with known IoT devices.

In some embodiments, the crawling of the online software app store may include crawling the online software app store at pre-determined intervals. In one example embodiment, crawling may enabled by a program or automated script to browse an online store or webpage in a methodical manner to identify a pre-determined object.

In some embodiments, after the identifying of the second software app, the method may further include downloading, by the security computing device, the second software app.

In some embodiments, the method may further include labeling, by the security computing device, the second IoT device with data related to the determined known security vulnerability; and storing, by the security computing device, the labeled data in a database.

In some embodiments, the determining that the second IoT device shares the same known security vulnerability may further include determining that the second IoT device is vulnerable to at least one of malware, ransomware, trojans, an outdated operating system, device hijacking, app level distributed denial of service (DDoS), permanent denial of service (PDoS), or man-in-the-middle attacks, or a combination thereof.

In some embodiments, a computer device may include a processor, a memory in electronic communication with the processor, and instructions stored in the memory, with the instructions being executable by the processor to perform a method for determining and protecting against a security vulnerability of an IoT device.

In some embodiments, one or more non-transitory computer-readable media may include one or more computer-readable instructions that, when executed by one or more computing devices, cause the one or more computing devices to perform a method for determining and protecting against a security vulnerability of an IoT device

BRIEF DESCRIPTION OF THE DRAWINGS

Embodiments will be described and explained with additional specificity and detail through the use of the accompanying drawings in which.

DETAILED DESCRIPTION

As the market size of Internet of Things (IoT) devices continues to increase, developers of IoT devices may be under pressure to compete in the market, resulting in prototyping and developing products quickly. During development, vendors may use pre-developed components (e.g., hardware, software, firmware, back end systems) to speed up the development process and to cut down on costs. In addition, IoT devices in general may be subject to security vulnerabilities, but the security vulnerabilities may be magnified if pre-developed components are used in multiple products without sufficient knowledge or testing of potential problems.

Security vulnerabilities and poor security practices may include, for example, outdated versions of operating systems, certificates with private keys, device hijacking, application level distributed denial of service (DDoS), permanent denial of service (PDoS), privacy/data/identity theft, man-in-the-middle attacks, etc. Unfortunately, however, it can be difficult to determine the presence of potential security vulnerabilities in IoT devices in order to protect users from potential or actual attacks.

In order to mitigate the proliferation of security issues throughout a network, a method is described which gains insights regarding how security each device on the market may be and determining what types of security vulnerabilities and issues may be present on the device. Gaining this insight provides valuable data for security analyses, as well as provides data to enable security services and software to enforce targeted security profiles to protect the device once the device is connected to a network. For purposes of brevity, the embodiments described herein are made in reference to a home environment (e.g., home automation); however, the embodiments may be applied to other IoT devices such as with respect to a vehicle, a business, etc.

The embodiments may provide the benefits of identifying or anticipating actual or potential security vulnerabilities and issues associated with an IoT device which could be transferred to other devices through network communications. By identifying security vulnerabilities and issues, actions may be implemented to prevent or mitigate attacks or the proliferation of the security vulnerabilities to other devices.

Figure 1:
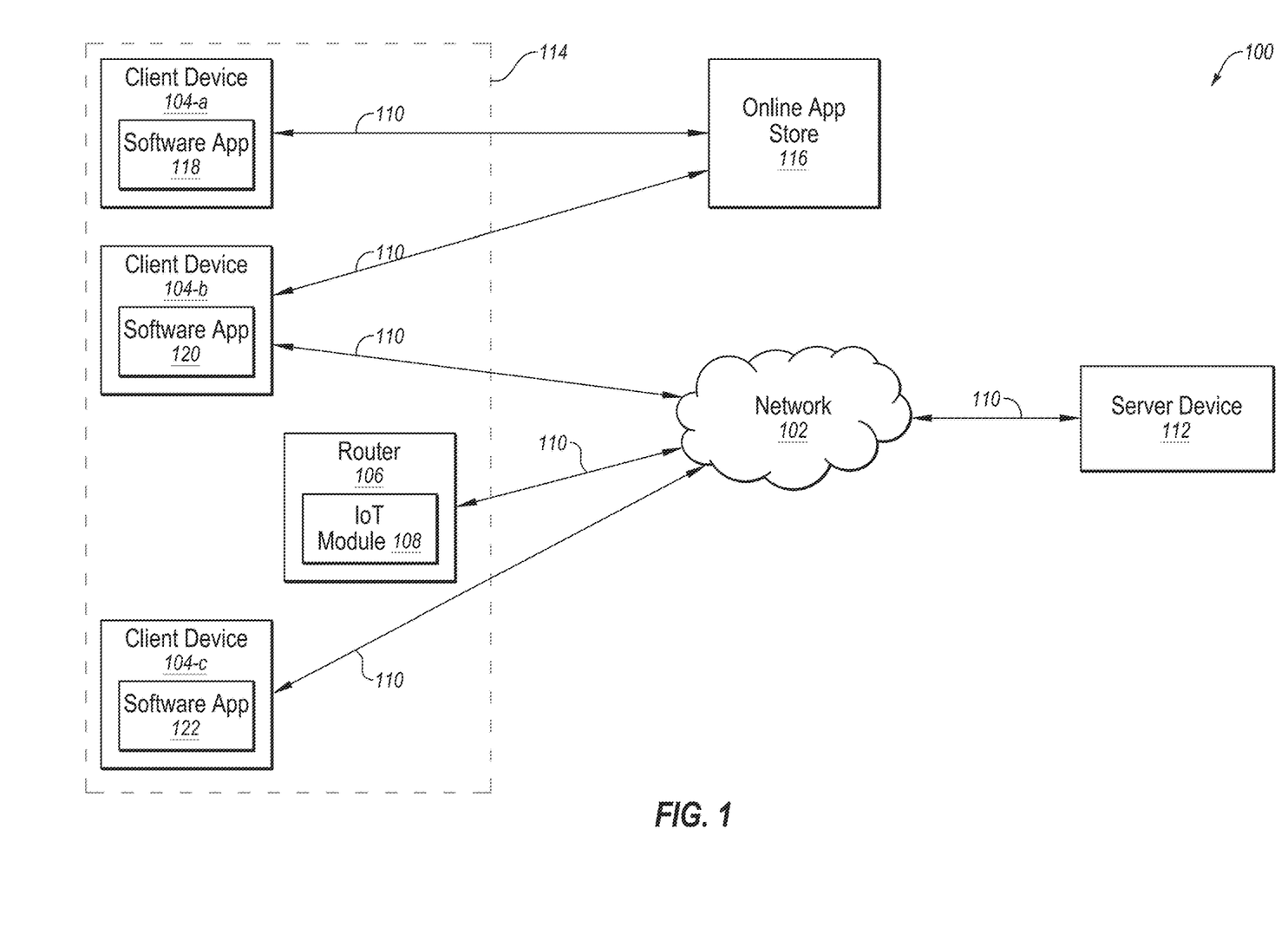
FIG. 1 illustrates an example system configured for determining and protecting against a security vulnerability of an IoT device

Turning to the figures, FIG. 1 illustrates an example system 100 configured for determining and protecting against a security vulnerability of an IoT device. The system 100 may include a network 102, client devices 104-a, 104-b, and 104-c, a router 106, an IoT module 108, and/or a server device 112. Although the IoT module 108 is shown as operating within router 106, in an additional or alternative embodiment, IoT module 108 may operate on a standalone computing device, or on at least one of the client devices 104-a, 104-b, 104-c, the server device 112, or another computing device. In one embodiment, client devices 104-a, 104-b, and 104-c, as well as router 106 may be located within a home 114 as part of a set of networked devices in a smart home.

In some embodiments, the network 102 may be configured to communicatively couple the client devices 104-a, 104-b, and/or 104-c, the router 106, and/or the server device 112. In some embodiments, the network 102 may be any wired or wireless network, or combination of multiple networks, configured to send and receive communications between systems and devices by way of example communication links 110. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3:
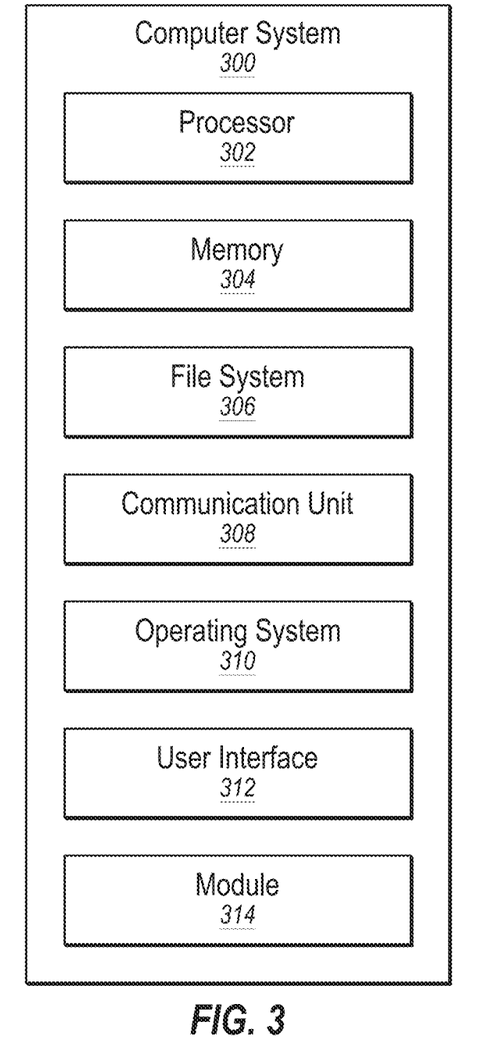
FIG. 3 illustrates an example computer system that may be employed in determining and protecting against a security vulnerability of an IoT device.

In some embodiments, the client devices 104-a, 104-b, and 104-c may be computer systems capable of communicating over the network 102 and capable of, at least, communicating with the router 106 (and thus the IoT module 108), examples of which are disclosed herein in connection with the computer system 300 of FIG. 3. In some embodiments, the client devices 104-a, 104-b, and 104-c may each be a computer device, such as a smartphone, desktop computer, laptop computer, control system, tablet, computer wearable device, etc. In some embodiments, the client devices 104-a, 104-b, and 104-c may be IoT devices (or "smart home" devices) such as lighting devices (e.g., light bulbs, lighting fixtures), HVAC devices (e.g., thermostats), appliances e.g., refrigerators, washers or dryer, dishwashers, garage doors, door locks), entertainment systems (e.g., automated assistants, audio and video systems, gaming consoles), etc.

Each of the client devices 104-a, 104-b, and 104-c may be communicatively coupled to one another through network 102. In addition, the client devices 104-a, 104-b, and 104-c may be communicatively coupled through a router 106. Router 106 may be, for example, a NORTON CORE™ Router owned by SYMANTEC CORPORATION®. The router 106 may execute the IoT module 108 in order to protect the client devices 104-a, 104-b, and 104-c from security vulnerabilities such as, but not limited to viruses and malicious content. In one example, a cybercriminal may access the client devices 104-a, 104-b, and/or 104-c (e.g., via network 102) and exploit the security vulnerabilities present in the client devices 104-a, 104-b, and/or 104-c to steal personal information, inject viruses, malware, ransomware, spam, etc. into the network 102.

Each of the client devices 104-a, 104-b, and/or 104-c may be a device made up of multiple hardware products, software, firmware, back end systems, etc. In addition, each of the client devices 104-a, 104-b, and/or 104-c may be associated with, or controlled by, software apps 118, 120, and 122, respectively. Each software app may be executed on one of the client devices 104-a, 104-b, and/or 104-c, or another device not specifically shown, such as a smartphone, a smartwatch, a tablet, a laptop, or a desktop computer. In some embodiments, these software app may be downloaded or accessed from an online application store ("app store") 116 such as the APPLE® APP STORE® or the GOOGLE PLAY™ store. Other app stores may be considered and are not limited to those discussed. Furthermore, although client devices 104-a and 104-b are specifically shown as connected through communication links 110, any device may be in communication with another device through communication links 110), and communication between devices is not limited to that shown in FIG. 1.

In some embodiments, the server device 112 may be any computer system capable of communicating over the network 102 with the client devices 104-*a*, 104-*b*, and/or 104-*c*, the router 106, and/or the IoT module 108. In some embodiments, the server device 112 may communicate with the client devices 104-*a*, 104-*b*, and/or 104-*c* through communications with the router 106 and/or the IoT Module 108. Examples of the client devices 104-*a*, 104-*b*, and 104-*c*, the router 106, the server device 112, and/or the IoT module 108 are disclosed herein in connection with the computer system 300 of FIG. 3.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Further, it is understood that the communication links 110 between the components illustrated in FIG. 1 (illustrated as left-right arrows) may be part of the network 102 or another network.

Due to the number of both current and emerging IoT devices, it would not be cost or time efficient for a security analyst to purchase every IoT device in order to determine security vulnerabilities. Furthermore, even if this were a possibility, or if it were a possibility on a smaller scale, the firmware and/or software of each device may not be accessible to users that are not deemed administrators. The firmware and/or software may be difficult to obtain and analyze is the firmware and/or software may be, for example, encrypted or in the form of a packed binary.

In many cases, however, IoT devices vendors may use pre-developed components used in previous IoT devices. These pre-developed components may include similar software (e.g., a similar or the same web server or cloud server, application engine, libraries, tool chains, open source projects, operating systems, etc.), similar hardware (e.g., Wi-Fi modules), similar protocols, similar cloud relay systems, similar development tool chains (e.g., software development kits (SDKs), compilers, etc.), similar sets of developers, etc. Other similar components may be contemplated. Any of these components may present a security issue, and thus the reuse of such components may result in transferring security vulnerabilities and bad security practices among different IoT devices.

Thus, instead of purchasing each different device, knowing which IoT devices have known security issues and comparing the similarities between new IoT devices may result in identifying potential security issues in the new IoT device by approximate device similarity through exposed interfaces.

Consequently, by identifying potential security issues, the router 106 may enable security services to enforce targeted security profiles to IoT devices identified as being connected to the network 102. In an additional or alternative embodiment, a different computing device that is not the router 106 may enable the security services.

In order to determine whether a pair of devices will execute and receive the same set of requests and responses (and thus present similarities from which security vulnerabilities may be determined), information may be obtained from the software app associated with each IoT device. As previously explained, each IoT device may be associated with an app that a user may install on a computing device (e.g., smartphone, smartwatch, tablet, laptop, desktop), and from which the user may control the IoT device. The app may enable the user to communicate, either directly or indirectly (e.g., by way of a cloud service), with the IoT device and further parse the responses returned by the IoT device. Such apps are widely available on app stores and can be obtained freely without administrator permissions.

Using the embodiments described herein, and through static and dynamic analysis of the apps, information regard the interfaces exposed by each IoT device may be obtained, similarities between each IoT device determined, and potential security vulnerabilities determined or anticipated.

In one embodiment, IoT module 108 may crawl an app store and download the apps associated with IoT devices. Crawling the app store may be done offline. In one embodiment, crawling the app store may be a periodic process, done a pre-determined times or at pre-determined intervals, or may be a constant process in which the app store is monitored for the upload of new apps. In one embodiment, IoT device apps may be identified through the identification of keywords, such as the presence of keywords in the app description in the app store. Some keywords may be known as keywords associated with IoT devices and thus may be easy to match (e.g., "automation," "remote control," "lighting,"). Other keywords may be determined using artificial intelligence or other machine learning techniques. For example, as more apps are determined to be associated with IoT devices, IoT module 108 may identify other keywords, which may be used to expand the search of related apps.

Once an IoT device app has been downloaded, IoT module 108 may perform an analysis on the app code. The analysis may be static and/or dynamic, and may determine what types of requests the app makes of the associated IoT Device. In addition, the IoT module 108 may determine what type of responses the app is expecting from the IoT Device. In one embodiment, requests may be analyzed through forward execution of the app, and responses may be reconstructed through symbolic execution.

IoT module 108 may create or update an existing database of the requests and responses obtained from each app. In the database, the requests and responses may be further associated with components of the IoT device. Each request and response, as well as the components, may then be cross-referenced with known requests, responses, and their associated components (e.g., rebranding, hardware, software, backend, protocol). The cross-references results in determining which of the IoT devices (both known and new) share the same set (or subset) of requests or responses.

In one embodiment, the similarities may be mapped to a scale, such as from 0.0 to 1.0, where 0.0 is indicative of no similarities, and 1.0 is indicative of two apps being exactly the same or very similar (and thus likely the associated IoT devices are exactly the same or very similar). Each associated app may be assigned a scaled value based on how many components associated with the IoT device are shared among other devices having known security issues. Thus, in one example, if the IoT device app being analyzed indicates that this IoT device shares the same protocols and hardware as two other devices with known security issues, this IoT device may be assigned a 0.6. In another example, if the IoT device app being analyzed indicates that this second IoT device shares the same hardware, software, backend, and protocol as one other device known to have security issues, this second IoT device may be assigned a 0.9, indicating a much higher likelihood of similarity between other known devices.

Because the IoT module 108 knows which already existing IoT devices or components have known security vulnerabilities, the requests and responses are compared and each new IoT device and/or component may be labeled with the determined similarities. In one embodiment, labeling each IoT device and/or component may be periodic and iterative.

The IoT module 108 may continue to monitor for new security issues reported and label IoT devices that were not previously labeled. In an alternative or additional embodiment, labels may be updated as security issues are determined to be resolved or, in some cases, get worse.

The previous steps may be enabled offline by the router 106 and/or the IoT module 108. In other words, the new IoT device need not be connected to a network in order to determine whether there are components of the IoT device that are associated with known security issues.

Once a user connects the IoT device to the network 102, the IoT module 108 may detect that the IoT device is connected. The IoT module 108 may communicate with a back end service (e.g, the server device 112) in order to determine what type of security action would be suit the security posture determined of the new IoT device.

In some embodiments, the IoT module 108 may thus implement a security action such as sending a notification to the user or to the IoT device vendor to update the IoT device firmware, block network connectivity to the IoT device, send an alert to the user that a security issue is potentially or actually present. In an alternative or additional embodiment, the IoT module 108 may isolate a compromised IoT device. For example, by analyzing the associated app, it may be determined that a new IoT device is vulnerable to code injection attacks. As a result, when the new IoT device is connected to network 102, the IoT module 108 may implement a proactive scan for incoming traffic and proactively block the vulnerable requests in order to protect the IoT device.

Figure 2:
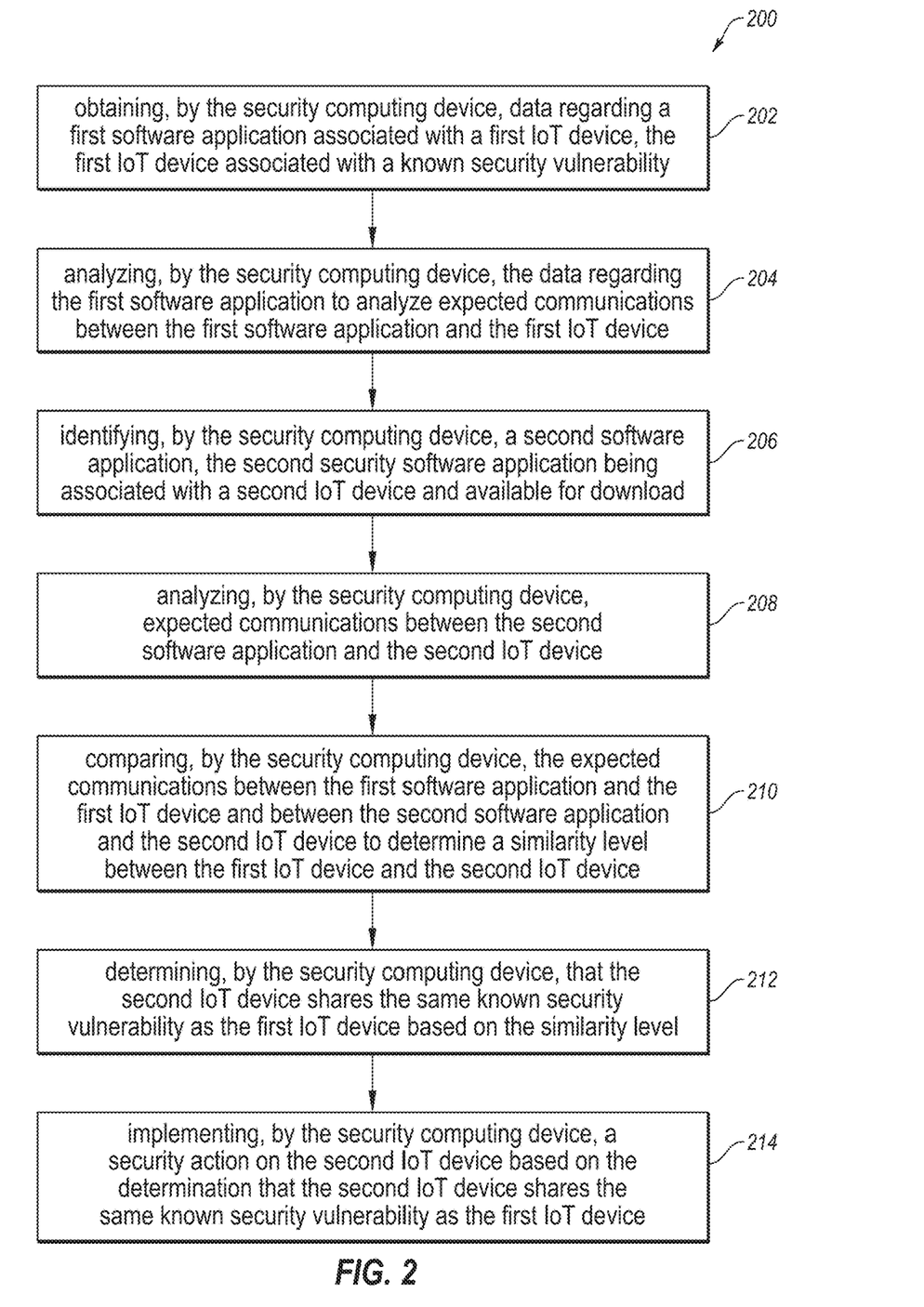
FIG. 2 illustrates a flowchart of an example method for determining and protecting against a security vulnerability of an IoT device.

FIG. 2 illustrates an example method 200 for determining and protecting against a security vulnerability of an IoT device. The method 200 may be performed, in some embodiments, by a device or system, such as by one or more of the client devices 104-a, 104-b, 104-c, the router 106, the IoT module 108, and/or the server device 112. In these and other embodiments, the method 200 may be performed by one or more processors based on one or more computer-readable instructions stored on one or more non-transitory computer-readable media. The method 200 will now be described in connection with FIG. 1.

Method 200 may include, at action 202, obtaining, by the security computing device, data regarding a first software app associated with a first IoT device, the first IoT device associated with a known security vulnerability. For example, the IoT module 108 may download the first software app 118 associated with client device 104-a from the online app store 116.

Method 200 may include, at action 204, analyzing the data regarding the first software app to analyze expected communications between the first software app and the first IoT device. For example, the IoT module 108 may analyze the requests and expected responses between the first software app 118 and the first IoT device (i.e., client device 104-a).

Method 200 may include, at action 206, identifying, by the security computing device, a second software app 120 associated with a second IoT device (i.e., client device 104-b) and available for download. For example, the IoT module 108 may crawl online app stores (e.g., online app store 116) and determine that an app is related to an IoT device based on keywords.

Method 200 may include, at action 208, analyzing, by the security computing device, expected communications between the second software app 120 and the second IoT device 104-b. For example, the IoT module 108 may analyze the requests and expected responses between the second software app 120 and the second IoT device 120.

Method 200 may include, at action 210, comparing the expected communications between the first software app 118 and the first IoT device (i.e., client device 104-a) and between the second software app 120 and the second IoT device (i.e., client device 104-b) to determine a similarity level between the first IoT device (i.e., client device 104-a) and the second IoT device (i.e., client device 104-b). For example, the IoT module 108 may determine that the first software app 118 and the second software app 120 include data from which it may be determined that the first and second IoT devices (i.e., client devices 104-a and 104-b, respectively) share the same firmware, hardware, software, protocols, back end services, etc.

Method 200 may include, at action 212 determining, by the security computing device, that the second IoT device (i.e., client device 104-b) shares the same known security vulnerability as the first IoT device (i.e., client device 104-a) based on the similarity level. For example, IoT module 108 may determine that the first and the second IoT devices are both subject to malware, ransomware, trojans, an outdated operating system, device hijacking, application level distributed denial of service (DDoS), permanent denial of service (PDoS), man-in-the-middle attacks, or a combination thereof.

Method 200 may include, at action 214, implementing a security action based on the determination that the second IoT device (i.e., client device 104-b) shares the same known security vulnerability at the first IoT device. For example, IoT module 108 may send a notification to a vendor associated with the second IoT device to update the second IoT device firmware, block network connectivity to the second IoT device, send an alert to the user that a security issue is potentially or actually present, or a combination thereof.

Although the actions of the method 200 are illustrated in FIG. 2 as discrete actions, various actions may be divided into additional actions, combined into fewer actions, reordered, expanded, or eliminated, depending on the desired implementation.

The systems and methods described herein may provide a plurality of benefits and technological improvements, and may result in the practical application of identifying security threats before a user and/or a device and/or a network is subject to an attack, thus enabling a security action to mitigate or prevent such an attack. Mitigating or preventing such attacks, as well as generally determining which IoT devices are likely to have security vulnerabilities also mitigates and prevents the proliferation of security issues through a network, preventing attacks across multiple devices and potentially multiple networks. In addition, mitigation of and prevention of security attacks serves the practical application of protection a user's personal and financial information.

Further, it is understood that the method 200 may improve the functioning of a computer system itself. For example, the functioning of any of the IoT devices (e.g., the client device 104-a, 104-b, and/or 104-c) may itself be improved by the method 200 by reducing or eliminating the opportunity for an attacker to take control of the IoT device, inject malware or viruses, or to obtain personal information of a user. Mitigating and/or preventing the introduction of security attacks to the IoT devices (e.g., client devices 104-a, 104-b, and/or 104-*c*) may result in the protecting against the attack of operations of functions essential to operation of the IoT device. Also, the method 200 may improve the technological field of personal and business privacy and security, but providing users with an opportunity to avoid providing personal and sensitive information to an attacker before an attack occurs and before any information can be gathered by an attacker. Such proactive prevention would also improve the security of economic, personal, medical, and other fields in which personal information is used.

FIG. 3 illustrates an example computer system that may be employed in determining security vulnerabilities of smart home devices. In some embodiments, the computer system 300 may be part of any of the systems or devices described in this disclosure. For example, the computer system 300 may be part of any of the client devices 104-*a*, 104-*b*, and/or 104-*c*, the router 106, the server device 112, and/or the IoT module 108 of FIG. 1.

The computer system 300 may include a processor 302, a memory 304, a file system 306, a communication unit 308, an operating system 310, a user interface 312, and a module 314, which all may be communicatively coupled. In some embodiments, the computer system may be, for example, a desktop computer, a client computer, a server computer, a mobile phone, a laptop computer, a smartphone, a wearable device (e.g., a smartwatch, heart rate monitor, oxygen detector, thermometer), a tablet computer, a portable music player, a networking device, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more of the actions of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more of the actions of the method 200 of FIG. 2. These computer-executable instructions may be included, for example, in the operating system 310, in one or more applications, such as the IoT module 108 of FIG. 1, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The module 314 may be one or more computer-readable instructions stored on one or more non-transitory computer-readable media, such as the memory 304 or the file system 306, that, when executed by the processor 302, is configured to perform one or more of the actions of the method 200 of FIG. 2. In some embodiments, the module 314 may be part of the operating system 310 or may be part of an application of the computer system 300, or may be some combination thereof. In some embodiments, the module 314 may function as the IoT module 108 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for determining and protecting against a security vulnerability of an Internet of Things (IoT) device, at least a portion of the method being performed by a security computing device comprising one or more processors, the method comprising:

obtaining, by the security computing device, data regarding a first software application associated with a first IoT device, the first IoT device associated with a known security vulnerability;

analyzing, by the security computing device, the data regarding the first software application to identify expected communications between the first software application and the first IoT device;

associating the expected communications between the first software application and the first IoT device with one or more components in the first IoT device, the one or more components in the first IoT device being the cause of the known security vulnerability;

identifying, by the security computing device, a second software application, the second security software application being associated with a second IoT device and available for download;

analyzing, by the security computing device, expected communications between the second software application and the second IoT device;

associating the expected communications between the second software application and the second IoT device with one or more components in the second IoT device, comparing, by the security computing device, the expected communications between the first software application and the first IoT device with the expected communications between the second software application and the second IoT device to determine a similarity level between the one or more components in the first IoT device and the one or more components in the second IoT device;

determining, by the security computing device, that the second IoT device shares the same known security vulnerability as the first IoT device based on the similarity level between the one or more components in the first IoT device and the one or more components in the second IoT device; and implementing, by the security computing device, a security action on the second IoT device based on the determination that the second IoT device shares the same known security vulnerability as the first IoT device.

2. The method of claim 1, further comprising:
after determining that the second IoT device shares the same known security vulnerability, determining, by the security computing device, that the second IoT device is connected to a network.

3. The method of claim 1, wherein the implementing of the security action further comprises at least one of:
sending a notification to a vendor associated with the second IoT device to update the second IoT device firmware, blocking network connectivity to the second IoT device, or
sending an alert to the user of the second IoT device that a security issue is potentially or actually present, or a combination thereof.

4. The method of claim 1, wherein the one or more components in the first and second IoT devices include at least one of a firmware, a hardware, a protocol, and a backend service.

5. The method of claim 1, wherein the analyzing of the expected communications further comprises:
identifying, by the security computing device, a request between the first or second software application and the first or second IoT device, respectively; and
identifying, by the security computing device, an expected response to the request.

6. The method of claim 1, wherein the identifying of the second software application further comprises:
obtaining, by the security computing device, keywords associated with known IoT devices; and
crawling, by the security computing device, an online software application store to identify that the second software application is associated with keywords associated with known IoT devices.

7. The method of claim 6, wherein the crawling of the online software application store further comprises:
crawling the online software application store at predetermined intervals.

8. The method of claim 1, further comprising:
after the identifying of the second software application, downloading, by the security computing device, the second software application.

9. The method of claim 1, further comprising:
labeling, by the security computing device, the second IoT device with data related to the determined known security vulnerability; and
storing, by the security computing device, the labeled data in a database.

10. The method of claim 1, wherein the determining that the second IoT devices shares the same known security vulnerability further comprises:

determining that the second IoT device is vulnerable to at least one of malware, ransomware, trojans, an outdated operating system, device hijacking, application level distributed denial of service (DDoS), permanent denial of service (PDoS), or man-in-the-middle attacks, or a combination thereof.

11. One or more non-transitory computer-readable media comprising one or more computer readable instructions that, when executed by one or more processors of a security computing device cause the computing device to perform a method for determining and protecting against a security vulnerability of an Internet of Things (IoT) device, the method comprising:
obtaining, by the security computing device, data regarding a first software application associated with a first IoT device, the first IoT device associated with a known security vulnerability;
analyzing, by the security computing device, the data regarding the first software application to identify expected communications between the first software application and the first IoT device;
associating the expected communications between the first software application and the first IoT device with one or more components in the first IoT device, the one or more components in the first IoT device being the cause of the known security vulnerability;
identifying, by the security computing device, a second software application, the second security software application being associated with a second IoT device and available for download;
analyzing, by the security computing device, expected communications between the second software application and the second IoT device;
associating the expected communications between the second software application and the second IoT device with one or more components in the second IoT device,
comparing, by the security computing device, the expected communications between the first software application and the first IoT device with the expected communications between the second software application and the second IoT device to determine a similarity level between the one or more components in the first IoT device and the one or more components in the second IoT device;
determining, by the security computing device, that the second IoT device shares the same known security vulnerability as the first IoT device based on the similarity level between the one or more components in the first IoT device and the one or more components in the second IoT device; and
implementing, by the security computing device, a security action on the second IoT device based on the determination that the second IoT device shares the same known security vulnerability as the first IoT device.

12. The one or more non-transitory computer-readable media of claim 11, wherein the method further comprises:
after determining that the second IoT device shares the same known security vulnerability, determining, by the security computing device, that the second IoT device is connected to a network.

13. The one or more non-transitory computer-readable media of claim 11, wherein the implementing of the security action further comprises at least one of: sending a notification to a vendor associated with the second IoT device to update the second IoT device firmware, blocking network connectivity to the second IoT device, or sending an alert to the user of the second IoT device that a security issue is potentially or actually present, or a combination thereof.

14. The one or more non-transitory computer-readable media of claim 11, wherein the one or more components in the first and second IoT devices include at least one of a firmware, a hardware, a protocol, and a backend service.

15. The one or more non-transitory computer-readable media of claim 11, wherein the analyzing of the expected communications further comprises:
   identifying, by the security computing device, a request between the first or second software application and the first or second IoT device, respectively; and
   identifying, by the security computing device, an expected response to the request.

16. The one or more non-transitory computer-readable media of claim 11, wherein the identifying of the second software application further comprises:
   obtaining, by the security computing device, keywords associated with known IoT devices; and
   crawling, by the security computing device, an online software application store to identify that the second software application is associated with keywords associated with known IoT devices.

17. A system for determining for determining and protecting against a security vulnerability of an Internet of Things (IoT) device, the system comprising:
   a processor;
   a memory in electronic communication with the processor; and
   instructions stored in the memory, the instructions being executable by the processor to:
      obtain, by the security computing device, data regarding a first software application associated with a first IoT device, the first IoT device associated with a known security vulnerability;
      analyze, by the security computing device, the data regarding the first software application to identify expected communications between the first software application and the first IoT device;
      associate the expected communications between the first software application and the first IoT device with one or more components in the first IoT device, the one or more components in the first IoT device being the cause of the known security vulnerability;
      identify, by the security computing device, a second software application, the second security software application being associated with a second IoT device and available for download;
      analyze, by the security computing device, expected communications between the second software application and the second IoT device;
      associate the expected communications between the second software application and the second IoT device with one or more components in the second IoT device,
      compare, by the security computing device, the expected communications between the first software application and the first IoT device with the expected communications between the second software application and the second IoT device to determine a similarity level between the one or more components in the first IoT device and the one or more components in the second IoT device;
      determine, by the security computing device, that the second IoT device shares the same known security vulnerability as the first IoT device based on the similarity level between the one or more components in the first IoT device and the one or more components in the second IoT device; and
      implement, by the security computing device, a security action on the second IoT device based on the determination that the second IoT device shares the same known security vulnerability as the first IoT device.

18. The system of claim 17, wherein the instructions are further executable by the processor to:
   after determining that the second IoT device shares the same known security vulnerability, determine, by the security computing device, that the second IoT device is connected to a network.

19. The system of claim 17, wherein when the processor implements the security action, the instructions are further executable to:
   send a notification to a vendor associated with the second IoT device to update the second IoT device firmware, block network connectivity to the second IoT device, or send an alert to the user of the second IoT device that a security issue is potentially or actually present, or a combination thereof.

20. The system of claim 17, wherein the one or more components in the first and second IoT devices include at least one of a firmware, a hardware, a protocol, and a backend service.

\* \* \* \* \*